June 6, 1967  KUNITOSHI TEZUKA  3,323,447
SCRAP COMPRESSOR
Filed Oct. 22, 1965

INVENTOR.
Kunitoshi Tezuka
BY
George B. Oujevolt
Attorney 3,323,447
SCRAP COMPRESSOR
Kunitoshi Tezuka, 34, 7 Minami Sunamachi,
Koto-ku, Tokyo-to, Japan
Filed Oct. 22, 1965, Ser. No. 501,499
1 Claim. (Cl. 100—238)

This invention relates to a scrap compressor.

It has been the usual practice in a conventional scrap compressor to simultaneously compress the entire surfaces of the whole volume of scrap accommodated in the compressor.

An object of the present invention is to provide a novel scrap compressor in which a plurality of suitable compression plates attached to a vertically movable disk are rotated so as to locally apply concentrated loading to scrap in succession and thereby obtain a good compression effect.

Another object of the invention is to provide a novel scrap compressor which is economical in power consumption but can obtain, by a relatively small amount of power, a compression effect substantially the same as that obtained by a conventional compressor requiring a great amount of power.

Still another object of the invention is to provide a novel scrap compressor which is light in weight and accordingly can be economically manufactured but can obtain a compression effect substantially the same as that obtained by a conventional compressor of heavy weight.

The scrap compressor of the present invention comprises a vertically movable disk rotatably disposed in the upper portion of a scrap chamber, said disk having a plurality of compression plates in the lower surface thereof.

Figure 1:
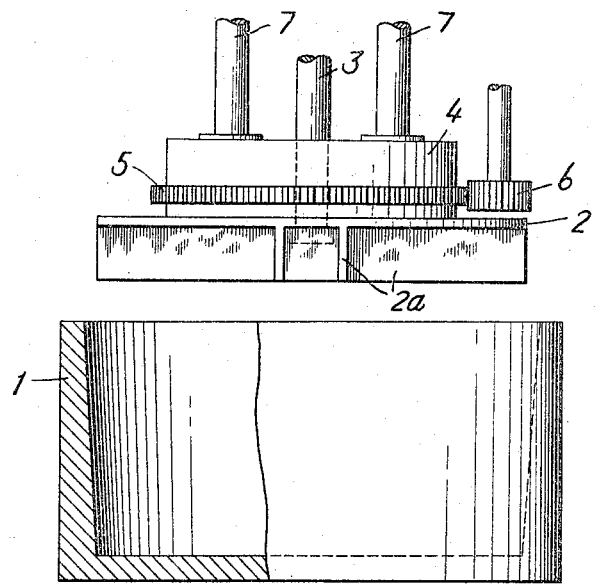
Figure 2:
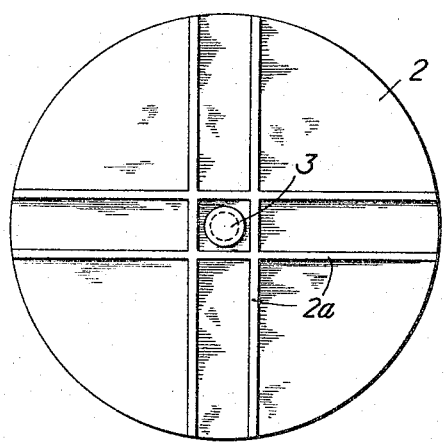

A preferred embodiment of the present invention will be described in detail hereinbelow with reference to the accompanying drawings, wherein:

FIG. 1 is a partially cut-away front view showing, partially in longitudinal cross-section, a scrap compressor embodying the present invention; and FIG. 2 illustrates a bottom view of the vertically movable disk.

Referring now to FIG. 1 of the drawings, a scrap chamber 1 for accommodating scrap and a vertically movable disk 2 are shown. Scrap chamber 1 is provided with sheels (not shown) so as to be movable on rails. A plurality of compression plates 2a are arranged in perpendicularly intersecting relationship, as will be seen from FIG. 2, in the lower surface of said vertically movable disk 2. These compression plates 2a are mounted rotatably by a central shaft 3, and rotation thereof may be effected by various means such as manual or hydraulic means or cam or lever means. In the embodiment as shown, however, in ring gear 5 is secured about the circumference of a drum 4, said gear 5 being adapted to be rotated by a driving pinion gear 6 which in turn is rotated by a motor through reduction gears (not shown). The vertically movable disk 2 is adapted to be vertically moved by plungers 7 actuated by a hydraulic mechanism.

In the construction as described above, scrap is charged in scrap chamber 1 with the vertically movable disk 2 being separated from said chamber, and the scrap chamber 1 is now containing scrap is then moved to a position rightly below said disk 2. With the scrap chamber maintained in this position, the vertically movable disk 2 is moved downwardly by plungers 7 so that the scrap in the chamber 1 may be locally compressed by said plurality of compression plates 2a arranged in the lower surface of the disk 2. Subsequently, after selecting any further portions of the scrap to be compressed, said disk 2 is suitably rotated by means of the reduction gears in such a manner that the compression plates 2a reach such further portions of the scrap in order to further compress the scrap in said portions. Thus, a complete compression of the scrap may be achieved by successively repeating the rotation of disk 2 and the local compression of the scrap in the described manner.

As will be apparent from the foregoing, the present invention provides complete compression of the entire volume of scrap to be compressed by repeating the above described operations of locally applying the load to the scrap and effecting a local compression through the rotation of both a vertically movable disk and a plurality of compression plates attached to the lower surface of the disk.

The scrap compressor of the present invention is advantageous in that it is remarkably economical in power consumption since it only requires far less power than the conventional compressor. The present invention has further advantages that compact compression of scrap can be made very effectively by repeating the local concentrated loading effected by the compression plates, and that the cost of manufacture is very low since the body of the apparatus can be made light in weight in proportion to the economy of power in use.

While the invention has been described and shown by way of example, it is to be understood that many modifications of the details are possible without departing from the spirit and scope of the appended claim.

What I claim:

A scrap compressor comprising a generally cylindrical scrap chamber, a generally circular compressor disc mounted for reciprocation and rotation with respect to said chamber, power means to reciprocate said disc into and out of said chamber, a drum extending from one side of said disc, a ring gear on said drum, a driven pinion gear engaged with said ring gear, and a plurality of compression plates mounted on and extending from the other side of said disc.

References Cited

UNITED STATES PATENTS 3,253,537   5/1966   Porter et al. _____ 100—238 X

FOREIGN PATENTS 700,855   3/1931   France.

BILLY J. WILHITE, Primary Examiner.